US011130409B1

(12) United States Patent
Bonny et al.

(10) Patent No.: US 11,130,409 B1
(45) Date of Patent: Sep. 28, 2021

(54) AUTOMATIC PERFORMANCE LEARNING SYSTEM FOR UTILITY VEHICLES

(71) Applicant: Hydro-Gear Limited Partnership, Sullivan, IL (US)

(72) Inventors: Nathan W. Bonny, Shelbyville, IL (US); Alyn G. Brown, Indianapolis, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 232 days.

(21) Appl. No.: 16/205,911

(22) Filed: Nov. 30, 2018

Related U.S. Application Data

(60) Provisional application No. 62/592,575, filed on Nov. 30, 2017.

(51) Int. Cl.
  *B60L 15/20* (2006.01)
  *G05B 13/02* (2006.01)
  *G07C 5/08* (2006.01)
  *G07C 5/02* (2006.01)

(52) U.S. Cl.
  CPC .......... *B60L 15/20* (2013.01); *G05B 13/0265* (2013.01); *G07C 5/02* (2013.01); *G07C 5/08* (2013.01); *B60L 2200/40* (2013.01)

(58) Field of Classification Search
  CPC .. B60L 15/20; B60L 2200/40; B60L 15/2018; B60L 15/2027; B60L 15/2081; B60L 15/2063; G05B 13/0265; G07C 5/02; G07C 5/08; B60W 60/00; G05D 2201/0208

USPC .......................................................... 701/22
See application file for complete search history.

(56) References Cited

U.S. PATENT DOCUMENTS

| 4,258,421 A | 3/1981 | Juhasz et al. |
| 5,948,026 A | 9/1999 | Beemer, II et al. |
| 7,076,348 B2 | 7/2006 | Bucher et al. |
| 7,953,526 B2 | 5/2011 | Durkos et al. |

(Continued)

FOREIGN PATENT DOCUMENTS

| EP | 2690582 | 1/2014 |
| EP | 3413090 | 12/2018 |

(Continued)

*Primary Examiner* — Angelina Shudy
(74) *Attorney, Agent, or Firm* — Neal, Gerber & Eisenberg LLP

(57) ABSTRACT

A performance learning system and method is provided for a utility vehicle. The performance learning system includes a propulsion system, a plurality of sensors disposed on the vehicle and capable of acquiring operational data associated with the vehicle, a processor, and a memory configured to store historical operational data. The processor can be configured to receive the operational data from the sensors, generate and transmit a command to control the propulsion system based on the operational data and the historical operational data, and update the historical operational data based on the operational data. The operational data may include characteristics associated with one or more of an operator of the vehicle or an operating environment of the vehicle. The systems and methods may optimize the performance of the utility vehicle for particular environments and conditions in which the utility vehicle is being operated and increase operator satisfaction.

20 Claims, 4 Drawing Sheets

(56) References Cited

U.S. PATENT DOCUMENTS

| | | | |
|---|---|---|---|
| 8,234,026 B2* | 7/2012 | Wyatt | B60W 10/30 |
| | | | 701/22 |
| 8,306,659 B2 | 11/2012 | Abramson et al. | |
| 8,630,768 B2 | 1/2014 | McClellan et al. | |
| 8,706,297 B2 | 4/2014 | Letsky | |
| 8,768,587 B2 | 7/2014 | Wulf et al. | |
| 9,152,938 B2 | 10/2015 | Lang et al. | |
| 9,499,199 B1 | 11/2016 | Laymon et al. | |
| 9,694,822 B2* | 7/2017 | Neaves | B60W 30/18072 |
| 9,851,718 B2 | 12/2017 | Booher | |
| 9,870,002 B1* | 1/2018 | Holmberg | B25J 9/162 |
| 10,058,031 B1 | 8/2018 | Brown et al. | |
| 10,060,827 B2 | 8/2018 | Schnell | G06Q 10/20 |
| 10,173,677 B2* | 1/2019 | Fairgrieve | B60T 8/175 |
| 10,183,662 B1* | 1/2019 | Bonny | B60W 30/18127 |
| 10,196,054 B2* | 2/2019 | Colavincenzo | B60L 50/15 |
| 10,440,880 B2* | 10/2019 | Wyatt | A01D 34/78 |
| 10,793,165 B2* | 10/2020 | Watanabe | G01C 21/3605 |
| 2003/0144774 A1 | 7/2003 | Trissel et al. | |
| 2005/0217398 A1* | 10/2005 | Hou | F16D 48/066 |
| | | | 74/11 |
| 2005/0228553 A1* | 10/2005 | Tryon | G01C 21/3617 |
| | | | 701/22 |
| 2008/0219866 A1* | 9/2008 | Kwong | F02D 23/00 |
| | | | 417/410.1 |
| 2009/0114463 A1* | 5/2009 | DeVault | B60K 6/445 |
| | | | 180/65.29 |
| 2011/0166731 A1* | 7/2011 | Kristinsson | B60W 10/26 |
| | | | 701/22 |
| 2013/0091694 A1* | 4/2013 | Hussain | B60K 6/442 |
| | | | 29/593 |
| 2013/0096745 A1* | 4/2013 | Hussain | B60W 10/02 |
| | | | 701/22 |
| 2013/0096746 A1* | 4/2013 | Hussain | B60L 50/16 |
| | | | 701/22 |
| 2013/0096747 A1* | 4/2013 | Hussain | B60W 10/02 |
| | | | 701/22 |
| 2013/0096748 A1* | 4/2013 | Hussain | B60W 20/20 |
| | | | 701/22 |
| 2013/0096749 A1* | 4/2013 | Hussain | B60W 10/08 |
| | | | 701/22 |
| 2013/0158855 A1* | 6/2013 | Weir | G09B 29/106 |
| | | | 701/400 |
| 2015/0203116 A1* | 7/2015 | Fairgrieve | B60W 30/18172 |
| | | | 701/93 |
| 2015/0379785 A1 | 12/2015 | Brown, Jr. et al. | |
| 2016/0106031 A1* | 4/2016 | Bejcek | A01D 34/69 |
| | | | 701/70 |
| 2017/0364828 A1 | 12/2017 | Bennett et al. | |
| 2018/0074497 A1* | 3/2018 | Tsuji | B60W 30/18163 |
| 2018/0334170 A1* | 11/2018 | Liu | B60W 30/192 |
| 2019/0073724 A1* | 3/2019 | Forsythe | G06Q 40/06 |
| 2019/0185018 A1* | 6/2019 | Tao | B60W 50/14 |
| 2020/0000023 A1* | 1/2020 | Chung | A01D 69/10 |
| 2020/0079381 A1* | 3/2020 | Lombrozo | G05D 1/0276 |
| 2020/0139841 A1* | 5/2020 | Ono | B60L 53/66 |
| 2020/0151611 A1* | 5/2020 | McGavran | H04W 4/44 |
| 2020/0225673 A1* | 7/2020 | Ebrahimi Afrouzi | |
| | | | G05D 1/0214 |

FOREIGN PATENT DOCUMENTS

| | | |
|---|---|---|
| JP | 2013122675 | 6/2013 |
| WO | WO2004071800 | 8/2004 |

* cited by examiner

AUTOMATIC PERFORMANCE LEARNING SYSTEM FOR UTILITY VEHICLES

CROSS-REFERENCE

This application claims the benefit of Provisional App. Ser. No. 62/592,575, filed on Nov. 30, 2017. This prior application is incorporated herein by reference in its entirety.

FIELD

The invention generally relates to the automated learning and optimization of performance characteristics for utility vehicles, such as lawnmowers, utility terrain vehicles, all-terrain vehicles, turf care devices, and the like.

BACKGROUND OF THE INVENTION

The conditions in which a utility vehicle may operate can vary widely and the performance of a utility vehicle is affected by these conditions. The drive characteristics of the vehicle can be affected by conditions such as geographic location and various operator attributes. For example, a utility vehicle may operate differently in hilly terrain as compared to flat terrain. As another example, the performance of the utility vehicle may be affected by the load being carried by the device, such as the weight of the operator and/or cargo.

There has been a recent trend to incorporate various electronic components, such as one or more electronic controllers, into utility vehicles. For example, in a hybrid electric lawn mowing vehicle, electronic controllers can be utilized to control one or more electric motors and a generator. These electronic controllers can provide a great degree of flexibility with regard to system control. Such electronic controllers are typically set up by various manufacturers, sales centers, and service centers to impart desirable drive characteristics to the vehicle.

Adapting the drive characteristics of a utility vehicle for a given set of conditions often requires the sales or service center to program the vehicle for such conditions. However, once the vehicle is programmed, the operator is typically not able to adjust the drive characteristics of the vehicle for differing conditions.

It is not uncommon for a particular utility vehicle to be operated by different operators and/or to be subjected to varied terrain within a short time frame. As a result, the drive characteristics of utility vehicles are frequently not optimized for the environmental and terrain conditions or for a specific operator, which can result in subpar performance. Therefore, further technological developments are desirable in this area.

SUMMARY OF THE INVENTION

In accordance with one embodiment, a performance learning system is provided for a vehicle having a propulsion system. The performance learning system includes a plurality of sensors disposed on the vehicle and capable of acquiring operational data associated with the vehicle, a processor in communication with the plurality of sensors and the propulsion system, and a memory in communication with the processor and configured to store historical operational data. The processor can be configured to receive the operational data from the sensors, generate and transmit a command to control the propulsion system based on the operational data and the historical operational data, and update the historical operational data based on the operational data. The operational data may include characteristics associated with one or more of an operator of the vehicle, an operating environment of the vehicle and the performance of one or more components of the propulsion system.

In accordance with another embodiment, a method of performance learning is provided for a vehicle. The method may include receiving operational data at a processor from one or more of a plurality of sensors disposed on the vehicle; generating and transmitting a command to control a propulsion system in communication with the processor, based on the operational data and historical operational data; and updating the historical operational data in a memory in communication with the processor, based on the operational data. The operational data may include characteristics associated with one or more of an operator of the vehicle, an operating environment of the vehicle and performance of one or more components of the propulsion system of the vehicle.

The systems and methods described herein may be particularly useful for utility vehicles, and can optimize the performance of the utility vehicle for particular environments and conditions in which the utility vehicle is being operated. The systems and methods may enable an operator of the vehicle to obtain substantially similar driving characteristics regardless of the various conditions in which the vehicle is used.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

Figure 1:
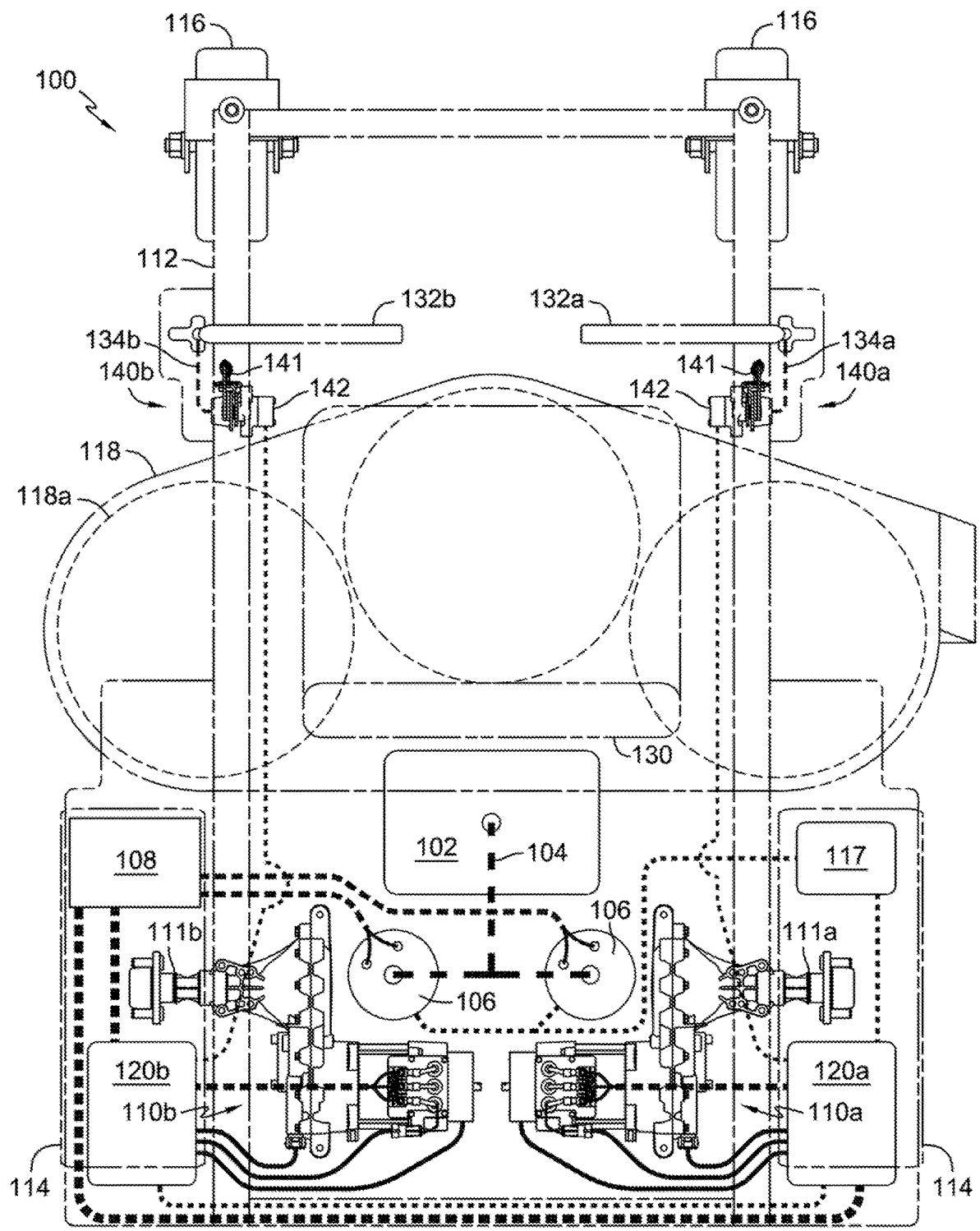
FIG. 1 is a partially schematic plan view of an exemplary utility vehicle that incorporates components of a performance learning system as disclosed herein.

FIG. 1 depicts an embodiment of a utility vehicle 100, which by way of example only is a zero turn hybrid riding lawnmower. Other electrically controlled vehicle propulsion systems such as solely battery-powered electric drives or electrically actuated hydraulic drives are contemplated within the principles of the invention. Various components of vehicle 100 can be mounted on and supported by a frame 112. In particular, an engine 102, one or more alternators 106, a battery 108, a set of electric zero turn transaxles 110a, 110b, and traction controllers 120a, 120b can be mounted on frame 112. Frame 112 also supports a deck 118, which may be of fixed height (relative to ground), ground-following, or height adjustable as known in the art. Deck 118 can include mowing blades 118a and is intended to be representative of not only blades, but other ground engaging equipment such as brush cutters, aerators, and the like. An operator seat 130 is positioned above deck 118 and is also affixed to frame 112. Frame 112 is supported above ground by a pair of caster wheels 116 and a pair of driven wheels 114.

Engine 102, such as an internal combustion engine, drives the alternator(s) 106 via a belt and pulley assembly 104. Engine 102 can provide feedback regarding parameters relating to its operational conditions, such as engine speed, engine load, engine temperature, and/or various engine fault conditions. Alternators 106 generate electric power to charge the battery 108, and it will be understood that alternator(s) 106 can be replaced with one or more generators. Alternator(s) 106 or generator(s) can provide feedback regarding parameters such as current, temperature, voltage, and the like. Battery 108 supplies electric power to a set of electric zero turn transaxles 110a, 110b. Electric zero turn transaxles 110a, 110b provide rotational output through a pair of output shafts 111a, 111b to rotationally drive the driven wheels 114.

Traction controllers 120a, 120b can control the speed and direction of driven wheels 114 by controlling respective electric zero turn transaxles 110a, 110b, based on inputs from an operator (sitting in operator seat 130). Traction controllers 120a, 120b are shown mounted near the rear of vehicle 100 near electric zero turn transaxles 110a, 110b away from engine 102 to aid in cooling, although other locations are possible. Traction controllers 120a, 120b can also receive feedback from the transaxles 110a, 110b regarding parameters such as current draw, motor speed, motor temperature, and the like.

The operator can provide speed and direction inputs through a pair of drive levers 132a, 132b to determine the output speed and direction of transaxles 110a and 110b, respectively. In vehicle 100, drive levers 132a, 132b are connected to a pair of speed control mechanisms 140a, 140b via corresponding mechanical linkages 134a, 134b. Speed control mechanisms 140a, 140b can each include a mechanical return to neutral (RTN) mechanism 141 and a potentiometer 142 (and/or a speed and direction input position sensor 236) to communicate the position of drive levers 132a and 132b to traction controllers 120a and 120b, respectively.

Based on the position of drive levers 132a, 132b, potentiometers 142 (and/or speed and direction input position sensors 236) can provide varying inputs to traction controllers 120a, 120b so that electric zero turn transaxles 110a, 110b (and driven wheels 114) are driven as desired by the operator. In the absence of inputs from the operator, RTN mechanisms 141 can force drive levers 132a, 132b to a neutral position. Front caster wheels 116 react in response to the actions of rear driven wheels 114.

Internal combustion engine 102 includes an output shaft (not shown), which can serve two functions. The first function can be driving a generator or alternator 106 that generates electricity for operating the electric zero turn transaxles 110a, 110b that drive the driven wheels 114 of utility vehicle 100. A second function can include driving a rotatable accessory output device, tool, implement or attachment, such as rollers, brushes, tillers, spreaders, sprayers or other power driven accessories.

A common feature shared by many mower attachments is that they can be driven by a belt that is coupled to the output shaft of an engine such as the internal combustion engine 102. In vehicle 100, for example, the rotation of engine 102 can turn a pulley (not shown) that, through a belt (not shown), drives the accessory devices, such as blades 118a.

Energy that is stored in battery 108 is then delivered by wiring to traction controllers 120a, 120b that control the current from battery 108, and direct the current to the proper components of utility vehicle 100. Energy from battery 108 could also be used in vehicle 100 to power electric deck motors (not shown) to drive the blades 118a, in lieu of using the previously described pulley and belt to drive blades 118a.

As shown in FIG. 1, a single transaxle is used to drive each of two driven wheels 114 of a four wheel vehicle. In other embodiments, other numbers and ratios of transaxles to driven wheels may be used. Additional details of a vehicle similar in many respects to vehicle 100 can be found in commonly owned U.S. Pat. No. 9,499,199, the disclosure of which is incorporated herein by reference in its entirety.

Each of the electric zero turn transaxles 110a, 110b includes an electric motor and a reduction gear box to maximize the efficiency of the electric motor. The reduction gear boxes are coupled to their respective driven wheels 114 through output shafts 111a, 111b. It will be understood that such gear boxes are not necessary in all situations, and the internal details of such gear boxes are known to persons of skill in the art.

Figure 2:
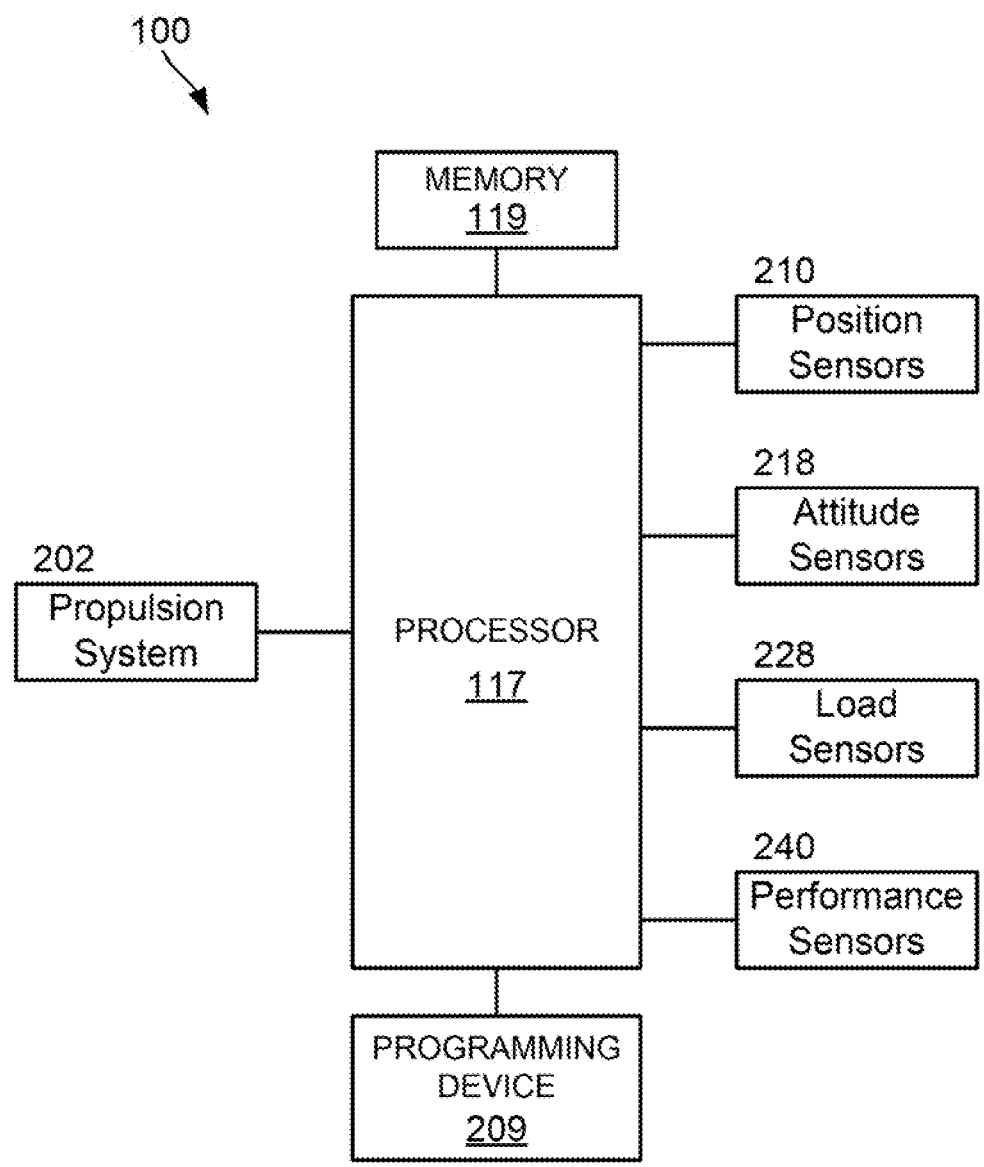
FIG. 2 is a diagram illustrating components of an embodiment of a performance learning system disclosed herein that can be used in conjunction with the vehicle of FIG. 1.
Figure 3:
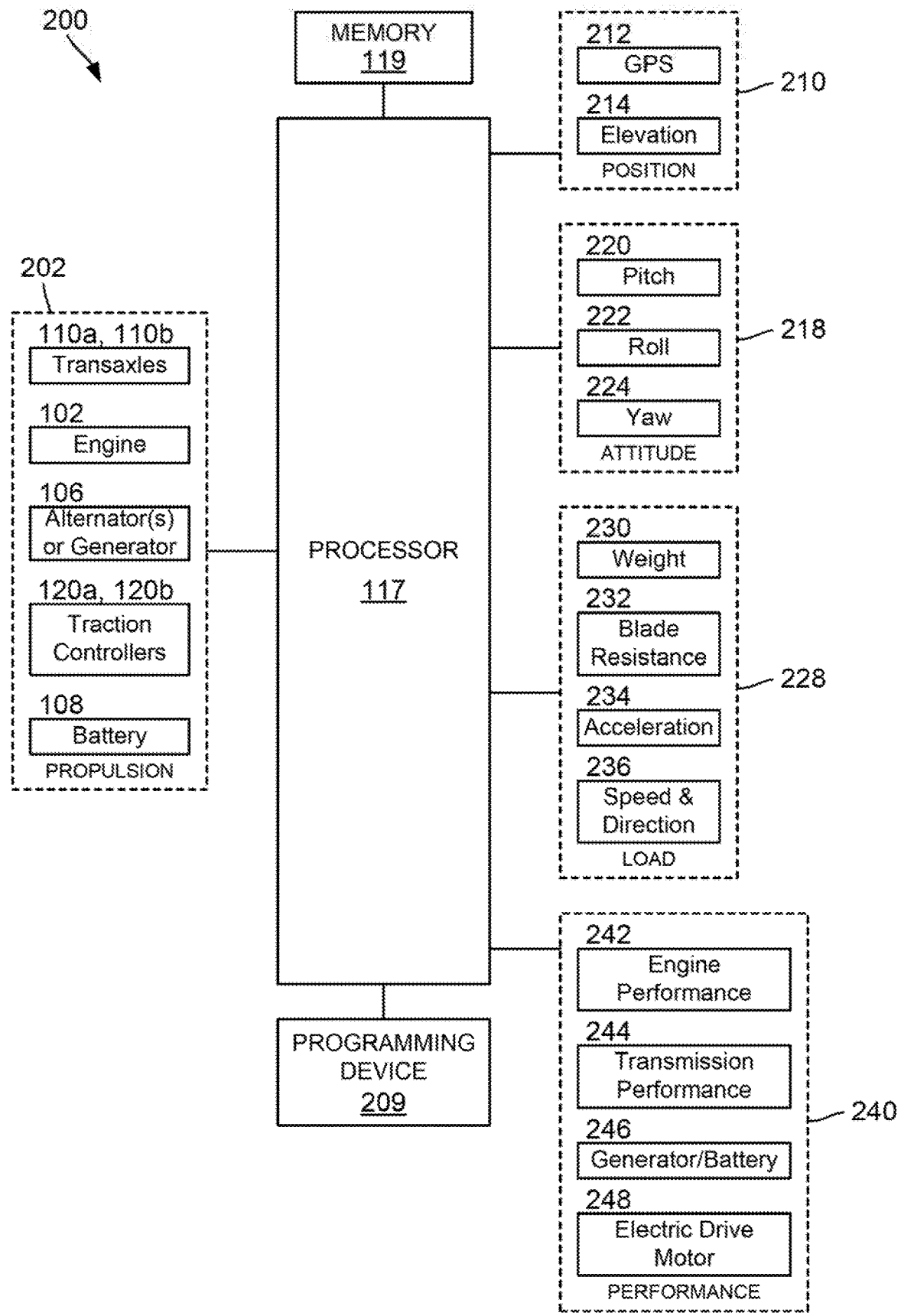
FIG. 3 is a diagram illustrating additional components of the performance learning system of FIG. 2 and including various input information that can be processed and various outputs achievable.
Figure 4:
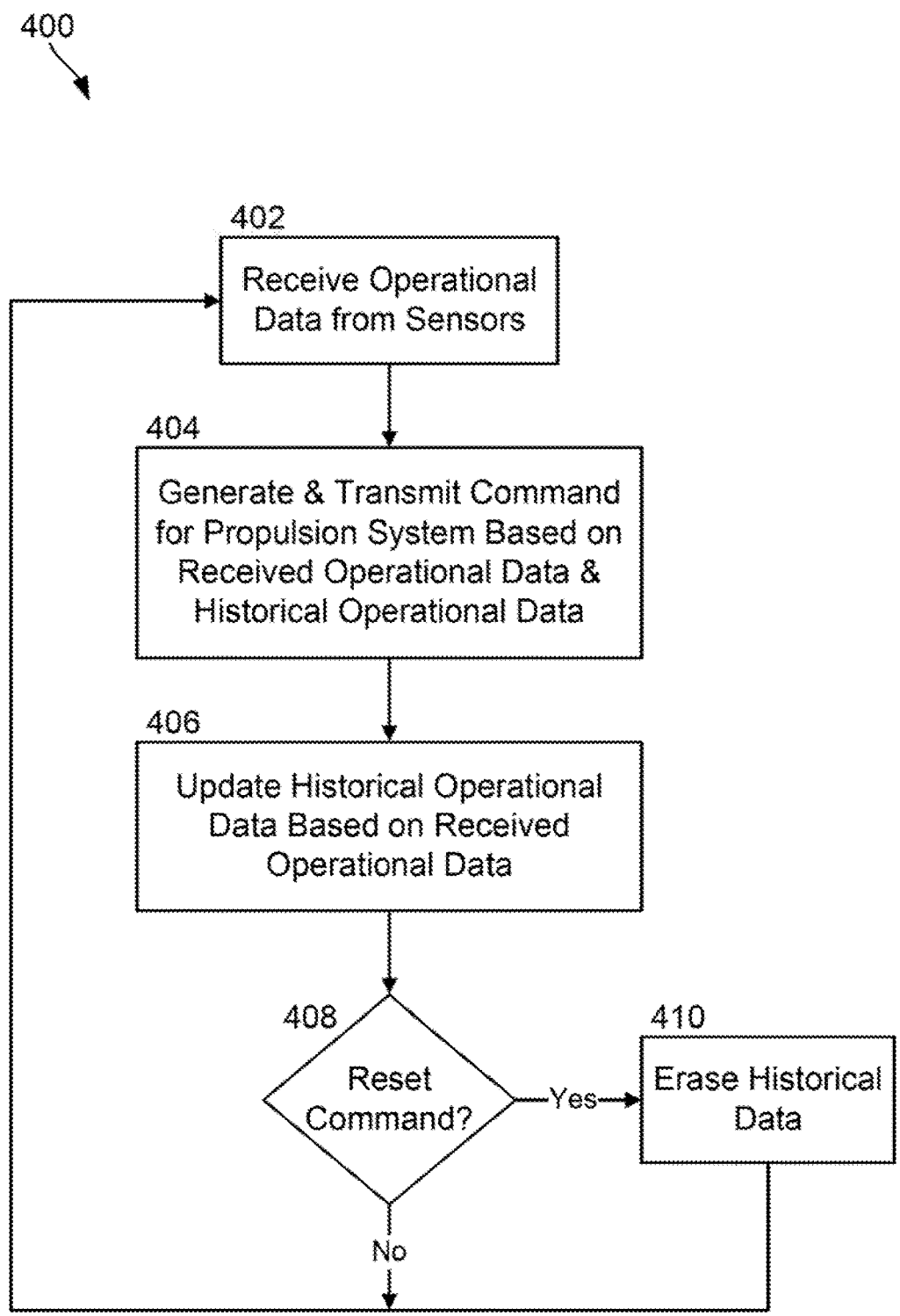
FIG. 4 is a flowchart illustrating operations for optimizing the performance of a vehicle using the performance learning system of FIG. 2.

A performance learning system 200 and performance learning method 400 for a vehicle such as utility vehicle 100 are shown in FIGS. 2-4. A utility vehicle 100, such as the zero turn radius lawnmower depicted in FIG. 1, is provided that includes a processor 117, a memory 119, a propulsion system 202, a programming device 209, position sensors 210, attitude sensors 218, load sensors 228, and performance sensors 240. In some embodiments, the processor 117 may be in direct communication with the other components. In other embodiments, the components may be in communication with one another via a bus (e.g., CAN Bus), as described in commonly owned U.S. Pat. No. 10,058,031, the disclosure of which is incorporated herein by reference in its entirety. Any suitable wired or wireless communications scheme may be utilized for the components to communicate with one another.

The propulsion system 202 may include components such as the engine 102, the transaxles 110a, 110b, the alternator(s) or generator(s) 106, the battery 108, and the traction controllers 120a, 120b. A programming device 209 may be utilized to program the processor 117, such as by selecting a particular mode that has corresponding commands, as described in more detail below. Such programming may be stored in the memory 119, for example. The programming device 209 can be a keyboard hard-wired to the processor 117, a mobile telephone, a computer, or any device that can provide a wired or wireless connection between the programming device 209 and the processor 117.

The processor 117 may receive operational data associated with the vehicle from the position sensors 210, attitude sensors 218, load sensors 228, and/or performance sensors 240. In embodiments, the processor 117 may also receive operational data from other sensors, such as an operator presence sensor, operator weight sensor, a parking brake engagement state sensor, a PTO engagement state sensor, and/or a vehicle neutral state sensor. The operational data may be represented in analog or digital signals, and may signify characteristics associated with the operator of the vehicle and/or the operating environment of the vehicle. It should be noted that "sensors," in some embodiments, may simply be switches.

The processor 117 may analyze and process the operational data from the various sensors, and generate a command to control aspects of the propulsion system 202. By controlling the propulsion system 202, the performance of the vehicle 100 may be optimized for the particular environments and conditions in which the utility vehicle 100 is being operated. This may result in increased satisfaction by the operator with the vehicle 100 since the vehicle may have substantially similar driving characteristics regardless of the various conditions in which the vehicle 100 is used.

Although specific digital and/or analog controllers and processors are discussed, any practical number and type of digital controllers, analog controllers, analog sensors, and/or processors can be incorporated into the vehicle 100, depending on the desired vehicle configuration. In certain embodiments, the controllers can form a portion of a processing subsystem including one or more computing devices having memory, processing, and communication hardware. The controllers may be a single integrated device or a distributed device having modules which communicate unilaterally or bilaterally with other modules. The functions of the controller may be performed by hardware and/or software. In various forms, the controllers may also include AC/DC converters, analog/digital converters, rectifiers, or the like.

Furthermore, it will be understood that although a large number of sensors are shown (e.g., in FIG. 3), the actual number of sensors that may be utilized can be fewer because one or more functions may be combined within a single sensor, in some embodiments. For example, the GPS module or sensor 212 (that determines geographic position) and the elevation sensor 214 can be embodied in a single GPS module or sensor that relates elevation with a particular geographic position, rather than employing the two separate sensors (as shown in FIG. 3). As another example, the pitch, roll, and yaw sensors 220, 222, and 224, respectively, can be combined into a single accelerometer-type sensor, or alternatively can comprise a plurality of sensors that are dispersed in various locations on the vehicle 100 to provide pitch, roll, and yaw output.

The position sensors 210 may determine the positioning of the vehicle 100 through the use of a GPS sensor 212 and/or an elevation sensor 214. The GPS sensor 212 may provide geo-location information. The elevation sensor 214 may provide information about the relative altitude of the vehicle 100. The altitude information can be used by the processor 117 to determine information such as the slope of the terrain on which the vehicle 100 is operating, the altitude fluctuation of the terrain (such as whether the terrain is hilly or flat), and/or the altitude change direction of the vehicle 100 (such as whether the vehicle 100 is travelling uphill or downhill).

The attitude sensors 218 may determine the attitude of the vehicle 100 through the use of a pitch sensor 220, a roll sensor 222, and/or a yaw sensor 224. The pitch sensor 220 may determine the relative pitch attitude of the vehicle 100. The roll sensor 222 may report on the relative roll attitude of the vehicle 100. The yaw sensor 224 may determine the relative yaw attitude of the vehicle 100. In some embodiments, the pitch sensor 220, the roll sensor 222, and/or the yaw sensor 224 may be implemented with one or more accelerometers.

In some embodiments, the attitude sensors 218 may comprise an inertial measurement unit (IMU) (not shown) that may include a 3-axis gyroscope, a 3-axis accelerometer and a 3-axis magnetometer to determine, among other parameters, the speed, turn rate, heading, inclination, and acceleration of vehicle 100.

The load sensors 228 may determine the load being borne by the vehicle 100 through the use of one or more weight load sensors 230, one or more blade resistance sensors 232, an acceleration sensor 234, and/or one or more vehicle speed and direction input position sensors 236. The weight load sensor(s) 230 may determine the amount of weight that is placed on the vehicle 100. In particular, the weight load sensor(s) 230 may assist the processor 117 to determine whether the vehicle is being operated by a light weight operator or a heavy weight operator. The weight load sensor(s) 230 may also determine the weight of other items carried on the vehicle 100, such as the weight of fuel that is in a fuel tank and/or the weight of cargo.

The blade resistance sensor(s) 232 may be used when the vehicle 100 is a lawnmower, for example. The blade resistance determined by the blade resistance sensor(s) 232 may provide an indication of the thickness of the grass or resistance of the grass to being cut by the blade(s) 118a. This information may be used by the processor 117 to vary the relative speed of the vehicle and the cutting blade(s) 118a to more effectively cut either light grass or heavy grass.

The acceleration of the vehicle 100 may be determined by the acceleration sensor 234 (or an IMU) and be compared to the expected acceleration, as indicated by the vehicle speed and direction input position sensor(s) 236. In this manner, information from these sensors may also assist the processor 117 in determining the load being borne by the vehicle 100.

The performance sensors 240 may monitor the performance parameters of components of the propulsion system 202 through the use of one or more engine performance sensors 242, one or more transmission performance sensors 244, one or more generator/battery sensors 246, and/or one or more electric drive motor sensors 248. For example, the performance data collected from these sensors may include the RPM of the engine 102, the output speed and direction of the transaxles 110a, 110b, and/or the discharge rate of the battery 108.

The performance learning system 200 and the performance learning method 400 may adjust the control parameters of the propulsion system 202 and optimize the performance of the vehicle 100, based on the operational data received from the various sensors described above. The processor 117 may adjust the propulsion system 202 in real time or near-real time by receiving operational data from the sensors, analyzing and processing the operational data and historical operational data, and generating commands to adjust the propulsion system 202.

Referring to FIG. 4, the performance learning method 400 may begin at step 402 to receive operational data at the processor 117 from the sensors. As discussed previously, the sensors may include, for example, the position sensors 210, attitude sensors 218, load sensors 228, and/or performance sensors 240. The operational data may indicate characteristics associated with an operator of the vehicle 100 and/or an operating environment of the vehicle 100.

At step 404, the processor 117 may generate one or more commands that are transmitted to one or more components of the propulsion system 202. The generated commands may be based on the operational data received at step 402 and/or historical operational data. One or more components of the propulsion system 202 may be adjusted based on the commands, which may affect the performance of the vehicle 100. For example, the adjustment may vary the amount of voltage or current for the electric drive motors in the transaxles 110a, 110b.

At step 406, the processor 117 may create or update the historical operational data in a memory 119, based on the operational data received from the sensors at step 402. In embodiments, the historical operational data may include averages of the operational data obtained during previous operational cycles of the vehicle 100, as described in more detail below.

At step 408, it may be determined whether a reset command has been received at the processor 117. The reset command may be received via a user interface, such as when the operator of the vehicle 100 desires to delete the historical operational data. If a reset command is received at step 408, then at step 410, the processor 117 may erase the historical operational data in the memory 119. The method 400 may return to step 402 to receive new operational data from the sensors, following step 410 or if a reset command is not received at step 408.

As an example, the processor 117 may adjust the propulsion system 202 based on monitoring the current in an electric motor in transaxles 110a, 110b via the electric drive motor sensor 248. By measuring the current being drawn by the electric motor, the performance of the electric motor can be compared to operational data from other sensors. By comparing and processing the operational data from the sensors, appropriate commands can be transmitted from the processor 117 to the propulsion system 202 to instruct components in the propulsion system 202 to operate in a desired manner for the conditions being experienced.

As another example, in the case of the operator of the vehicle 100 being of a heavy weight, the sensors may be able to sense the increased weight of the operator. For example, the weight load sensor(s) 230 may directly sense the increased weight. Alternatively, the operational data from the electric drive motor sensors 248 and from the vehicle speed and direction input position sensors 236 may indicate the increased weight. In particular, the current draw on the electric drive motors can be compared to the positions of the speed and direction input position sensors 236. By determining the positions of the speed and direction input position sensors 236 and comparing them to the speed of the vehicle 100 and its acceleration rate, the weight of the operator may be generally determined. For example, a heavier than expected current draw on the electric drive motor during full speed acceleration may suggest an increased weight (or could indicate that the vehicle 100 is moving uphill). In some embodiments, the time that it takes the vehicle 100 to achieve maximum speed could be measured. If this time were greater than the time expected and/or the maximum speed achieved was less than expected, it could be concluded that there is an increased weight.

After the processor 117 determines that there is an increased weight, the processor 117 could generate and transmit a command to adjust the performance of the propulsion system 202. For example, the processor 117 may adjust the acceleration curve to allow more current to the motor so that it can achieve more acceleration. The processor 117 may adjust the acceleration curve depending upon user weight, in some embodiments, such that the vehicle 100 can achieve desired performance results regardless of the weight of the operator.

In embodiments, the vehicle 100 may also utilize data from the GPS sensor 212 to set parameters. For example, if the GPS sensor 212 determines that the vehicle 100 is in an area of West Virginia where the terrain is hilly and rocky, the processor 117 may set a lower top speed and a "hill safe mode" may be entered. On the other hand, if the GPS sensor 212 determines that the vehicle 100 is in a flat area of Kansas, a "flat terrain mode" may be entered so that the processor 117 permits the vehicle to achieve a greater top speed.

It may be preferable to not adjust the propulsion system 202 too quickly so that the change in the performance of the vehicle 100 is not too abrupt and so the operator is not surprised or dissatisfied with the operation of the vehicle 100. In embodiments, a rolling average learning scheme may be utilized in the performance learning system 200 to determine the commands generated by the processor 117 based on the operational data received from the sensors. By using a rolling average learning scheme, a series of minor adjustments may be made over a longer period of time so that the performance adjustments to the vehicle 100 are less abrupt and less noticed by the operator. The vehicle 100 may therefore have a more consistent feel and the operator may perceive the vehicle 100 as possessing more consistent handling characteristics.

In embodiments, the performance of the vehicle 100 may be optimized by establishing a rolling average of operational data from the sensors to create historical operational data, i.e., a rolling "normal" (i.e., baseline) set of operational data. In order to establish this rolling average, the processor 117 may utilize operational data over a pre-determined number of operational cycles of the vehicle 100. For example, the processor 117 may average the operational data from the last ten operational cycles of the vehicle 100. An operational cycle may include each time a vehicle 100 is started and run, e.g., when a lawnmower is started to mow a particular lawn. For example, there may be more than one operational cycle in a single day if the vehicle 100 is used in multiple areas, such as by being used at a first lawn, shut off, transported to a second lawn, being used at the second lawn, shut off again, transported to a third lawn where it is used, and shut off when finished.

The rolling average for the parameters that are experienced by the vehicle 100 (and the ensuing operational data) during the last pre-determined number of operational cycles that is recorded by the processor 117 may be the historical operational data that is used to determine the commands that are transmitted to the propulsion system 202.

The following describes an example where it is assumed that the vehicle 100 is configured such that the last ten operational cycles are utilized to develop a rolling average and a baseline performance. Based on the current operational data and the historical operational data from the sensors over the last ten operational cycles, the processor 117 may process this historical operational data to determine an appropriate command for the propulsion system 202 of the vehicle 100.

As an example of a rolling average of the operational data from the sensors, the historical operational data used for the 15th operational cycle of the vehicle 100 would be the operational data that was collected from cycles five through 14. Similarly, the historical operational data used for the 27th operational cycle of the vehicle 100 would be the operational data that was collected from cycles 17 through 26. Due to the use of a rolling average, the performance characteristics of the vehicle 100 will tend to change dynamically, unless the vehicle 100 has a generally identical set of operating conditions, such as if the vehicle 100 is always used on the same terrain and is driven by the same operator. In this situation, the vehicle 100 will have generally constant performance characteristics over its lifetime.

In contrast, the performance characteristics may vary more significantly, e.g., if the vehicle 100 is used and owned by a first operator in a certain terrain or location, then is sold to be used and owned by a second operator in a different terrain or location. The performance characteristics of the vehicle 100 may be changed significantly by the performance learning system 200 when the second operator begins using the vehicle 100. For example, the first operator may be of a lighter weight and have used the vehicle 100 in a location where there is generally flat terrain, while the second operator may be of a heavier weight and have used the vehicle 100 in a location where there is hillier terrain. In this situation, the commands to the propulsion system 202 (and the performance of the vehicle 100) may therefore change over a period of time. However, when a rolling average is used to produce historical operational data, the changes to the performance of the vehicle 100 may be made gradually with each operational cycle. For example, after ten operational cycles by the second operator, it is likely that the commands that are output to the propulsion system 202 would be different than the commands that were output to the propulsion system 202 before the change of operators and locations/terrains. Assuming that the second operator continues to use the vehicle 100, the commands output to the propulsion system 202 would ultimately reach a "new normal" (i.e., a new baseline) and would remain generally constant for the second operator. In some embodiments, the second operator may reset the historical operational data gathered during operation of the vehicle 100 by the first operator, as described previously, such as when the second operator purchases the vehicle 100. This may allow the performance of the vehicle 100 to adapt more quickly to the second operator and the terrain and location the vehicle 100 is being operated in.

Another way in which adjustments may be made to optimize the performance of the vehicle 100 may be to utilize pre-programmed data values, such as lookup tables that reflect the perceived best operational parameters, i.e., commands sent to the propulsion system 202, for certain situations. For example, there may be three sets of commands that can be selected by the processor 117, where the selection is based on a rolling average of the operational data from the last ten operational cycles. Based on the rolling average of the operational data, i.e., historical operational data, the processor 117 may decide to utilize commands that fall, for example, into one of three categories, such as a first category for flat terrain, a second category for gently rolling terrain, and a third category for mountainous terrain.

A further way to optimize performance of the vehicle 100 may be to allow an operator to select among different modes via the programming device 209. For example, there may be six modes with respective preset commands for the propulsion system 202, as follows:

| Mode # | Terrain Type | Operator Characteristics |
|--------|--------------|--------------------------|
| 1 | Flat | Light weight |
| 2 | Flat | Heavy weight |
| 3 | Hilly | Light weight |
| 4 | Hilly | Heavy weight |
| 5 | Mountainous | Light weight |
| 6 | Mountainous | Heavy weight |

The operator may select a particular mode and therefore commands for the propulsion system 202 corresponding to that selected mode. For example, the fifth mode may be selected when there is mountainous terrain with a lighter weight operator. The preset commands for this mode may have been chosen to provide the best performance characteristics for the vehicle 100 in this situation.

In another embodiment, the commands from the processor 117 may be transmitted to control the performance of a generator. In a hybrid system, for example, outputting commands to the generator can be useful in situations where terrain varies. For example, the maximum charged voltage of a hybrid system battery 108 can determine the amount of excess storage capacity that the battery 108 has available to accommodate electric power generated by a regenerative braking system of the vehicle 100. In a hilly environment, it may be useful to limit charging of the battery 108 to 80% of maximum capacity, for example, so that there is a 20% capacity reserve to allow for the electricity generated by regenerative braking to be stored in the battery 108.

Conversely, if the vehicle 100 is operating in areas that are relatively flat, regenerative braking would generate less power to be stored in the battery 108. In these situations, it may be useful to command the generator to utilize more of the available storage capacity of the battery 108 to thereby increase the amount of time that the vehicle 100 can run without requiring power generation by the engine 102 or the generator. In the variable terrain situations described above, processor 117 can command the generator to adapt its output parameters (i.e., employ adaptive charging) based on a programmed number of operational cycles and the use of a rolling average to maintain the optimum battery charge level, based on sensed terrain and operator characteristic inputs described herein.

Typically, in vehicles with friction brakes (e.g., drum and disc brakes), energy is dissipated into heat when the brakes are applied. This dissipated heat energy may cause the brakes to get hot due to the kinetic energy of the vehicle being converted into heat energy through the frictional engagement of the brakes. However, for vehicles without friction brakes, excess power may often need to be dissipated when the vehicle 100 is slowing down. For example, in a hybrid vehicle, it may be desirable to dissipate the energy when the vehicle is slowing down by recycling the energy back into the battery 108. Therefore, when in a braking mode, the electric drive motors in transaxles 110*a*, 110*b* may be used as generators to deliver electricity to charge the battery 108. Using the drive motors as generators in this braking mode applies torque to output shafts 111*a*, 111*b* that assists in slowing down the vehicle 110.

The limiting factor for recharging the battery 108 through such a system is the amount of capacity available within the battery 108 at that point in time. Therefore, if the battery 108 is close to being fully charged and energy is being cycled into the battery 108 during braking, damage may result to the regeneration system and/or the battery 108. Therefore, in a hybrid vehicle that relies on regenerative braking, some excess or reserve capacity should be maintained in the battery 108 to handle the energy that is generated by the regeneration system.

The amount of energy generated by the regeneration system is based primarily on the slope of the terrain, the weight of the operator and/or cargo, and how the vehicle is being used. For example, the regenerative capacity that is preferably permitted to remain in the battery 108 (i.e., the inverse of the battery charge level) would likely be greater if the vehicle is being used by an operator of heavier weight in mountainous terrain who often descends steep hills. This is because such operation would tend to generate more power because the vehicle has more weight when going downhill, as compared to a vehicle with an operator of lighter weight. When going downhill, the speed of the vehicle, the weight of the vehicle, the weight of the operator, and the incline will all contribute to the amount of force required to slow down the vehicle. Therefore, a large amount of energy will be generated by a regeneration system when a heavier operator slows down a vehicle on a steep hill since the amount of force generated by a regenerative system is directly related to the amount of force required to slow down the vehicle.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A mower, comprising:
   a propulsion system;
   one or more load sensors configured to collect load data indicative of a weight disposed on the mower;
   memory configured to store a baseline load; and
   a processor in communication with the one or more load sensors, the memory, and the propulsion system, the processor configured to:
     determine a measured load based on the load data indicative of the weight disposed on the mower;
     compare the measured load to the baseline load; and
     generate and transmit a command to control the propulsion system to adjust an acceleration curve for the propulsion system based on the comparison of the measured load and the baseline load.

2. The mower of claim 1, wherein the propulsion system comprises, a transaxle driving a wheel, and a traction controller in communication with the processor and the transaxle, wherein the traction controller is configured to receive the command from the processor and control the transaxle based on the command.

3. The mower of claim 1, wherein the processor is further configured to determine the baseline load based on a rolling average of historical data collected over a predefined number of preceding operational cycles of the mower.

4. The mower of claim 3, wherein the processor is further configured to receive a reset command and erase the historical data in the memory in response to receiving the reset command in order to reset the rolling average.

5. The mower of claim 1, wherein, in response to determining that the measured load is greater than the baseline load, the processor is further configured to adjust the acceleration curve to enable more current to for the propulsion system to increase acceleration generated by the propulsion system.

6. The mower of claim 1, wherein the one or more load sensors comprises a weight sensor.

7. The mower of claim 1, wherein the one or more load sensors comprises an acceleration sensor and one or more vehicle speed and direction-input-position sensors.

8. A mower having a performance learning system, the mower comprising:
   a propulsion system;
   one or more sensors configured to acquire operational data indicative of a characteristic associated with the mower, the characteristic being a weight disposed on the mower or a location of the mower;
   memory configured to store historical operational data of the characteristic; and
   a processor in communication with the one or more sensors and the memory, the processor configured to:
     receive the operational data from the one or more sensors;
     determine a rolling average of the characteristic based on the historical operational data;
     generate and transmit a command to control operation of the propulsion system based on a comparison of the operational data and the rolling average; and
     update the historical operational data based on the operational data.

9. The mower of claim 8, wherein the processor is further configured to determine the rolling average based on the historical operational data collected over a predefined number of preceding operational cycles of the mower.

10. The mower of claim 9, wherein the propulsion system comprises a battery and a generator connected to the battery, wherein the processor causes the generator to adapt output parameters to maintain an optimum charge level in the battery.

11. The mower of claim 9, wherein the processor is further configured to erase the historical operational data in the memory in response to receiving a reset command in order to reset the rolling average of the characteristic.

12. The mower of claim 8, wherein the propulsion system comprises a prime mover, a transaxle driving a wheel of the mower, and a traction controller in communication with the processor and the transaxle, wherein the traction controller is configured to receive the command from the processor and control the transaxle, based on the command.

13. The mower of claim 8, wherein the propulsion system comprises a prime mover, the one or more sensors comprises a load sensor for measuring the weight disposed on the mower, and wherein the processor is further configured to adjust an acceleration curve of the prime mover based on the comparison of the operational data and the historical operational data.

14. The mower of claim 8, wherein the one or more sensors comprises a position sensor for determining the location of the mower, and wherein the processor is further configured to adjust a top speed of the mower based on the comparison of the operational data and the historical operational data.

15. A mower, comprising:
   a propulsion system;
   one or more position sensors configured to collect position data;
   memory configured to store terrain data indicative of terrain types for a plurality of locations; and
   a processor in communication with the one or more position sensors, the memory, and the propulsion system, the processor configured to:
     determine a location of the mower based on the position data;
     identify a current terrain type based on the location of the mower and the terrain data stored in the memory; and
     generate and transmit a command to the propulsion system to adjust a top speed of the mower based on the current terrain type.

16. The mower of claim 15, wherein the one or more position sensors comprises at least one of a GPS sensor and an elevation sensor.

17. The mower of claim 15, wherein the processor is further configured to:

decrease the top speed of the mower in response to determining that the current terrain type is hilly terrain; and increase the top speed of the mower in response to determining that the current terrain type is flat terrain.

18. The mower of claim 15, wherein the processor is further configured to identify the current terrain type of the mower by comparing the location of the mower to the locations stored in the memory.

19. The mower of claim 15, wherein:

the memory is further configured to store historical location data; and the processor is further configured to:

update the historical location data based on the location of the mower;

determine a rolling location average based on the historical location data; and identify the current terrain type of the mower by comparing the rolling location average to the locations stored in the memory.

20. The mower of claim 19, wherein the processor is further configured to determine the rolling location average based on the historical location data collected over a predefined number of preceding operational cycles of the mower.

* * * * *